United States Patent
Okuda et al.

(10) Patent No.: US 10,591,171 B2
(45) Date of Patent: Mar. 17, 2020

(54) HEAT PUMP

(71) Applicant: Yanmar Co., Ltd., Osaka-shi, Osaka (JP)

(72) Inventors: Norihiro Okuda, Osaka (JP); Terunori Aikawa, Osaka (JP); Hirotoshi Kihara, Osaka (JP)

(73) Assignee: YANMAR CO., LTD., Osaka (JP)

( * ) Notice: Subject to any disclaimer, the term of this patent is extended or adjusted under 35 U.S.C. 154(b) by 103 days.

(21) Appl. No.: 15/528,370

(22) PCT Filed: Nov. 18, 2015

(86) PCT No.: PCT/JP2015/082457
§ 371 (c)(1),
(2) Date: May 19, 2017

(87) PCT Pub. No.: WO2016/080463
PCT Pub. Date: May 26, 2016

(65) Prior Publication Data
US 2017/0328583 A1 Nov. 16, 2017

(30) Foreign Application Priority Data
Nov. 21, 2014 (JP) .................. 2014-237143

(51) Int. Cl.
*F24F 1/16* (2011.01)
*F24F 1/46* (2011.01)
(Continued)

(52) U.S. Cl.
CPC .............. *F24F 1/16* (2013.01); *F02M 21/023* (2013.01); *F24F 1/10* (2013.01); *F24F 1/18* (2013.01);
(Continued)

(58) Field of Classification Search
CPC ........ F24F 1/16; F24F 1/10; F24F 1/60; F24F 1/46; F25B 40/02; F25B 41/003; F25B 13/00; F25B 2400/06; F25B 2400/13
See application file for complete search history.

(56) References Cited

U.S. PATENT DOCUMENTS 4,959,975 A * 10/1990 Harris ...................... F24H 4/04
62/238.6
5,832,733 A * 11/1998 Shimotani ................ F24F 1/16
62/196.2
(Continued)

FOREIGN PATENT DOCUMENTS

CN 102927651 A 2/2013
JP 2001-280760 A 10/2001
(Continued)

OTHER PUBLICATIONS

International Preliminary Report on Patentability (PCT/IB/338 & PCT/IB/373) issued in PCT Application No. PCT/JP2015/082457 dated Jun. 1, 2017, including English translation of document C2 (Japanese-language Written Opinion (PCT/ISA/237)) previously filed on May 19, 2017 (6 pages).
(Continued)

*Primary Examiner* — Nelson J Nieves
(74) *Attorney, Agent, or Firm* — Norton Rose Fulbright US LLP

(57) ABSTRACT

A subcooler is made up of a plate type heat exchanger. The accumulator is located between a compressor and the subcooler in a width direction of an outdoor unit in a planar view. The subcooler overlaps with the accumulator in the width direction in the planar view. As a result, a compact heat pump can be provided when the subcooler is a plate type heat exchanger.

19 Claims, 5 Drawing Sheets

(51) Int. Cl.
*F24F 1/18* (2011.01)
*F25B 41/00* (2006.01)
*F02M 21/02* (2006.01)
*F24F 1/10* (2011.01)
*F25B 13/00* (2006.01)
*F04B 39/02* (2006.01)
*F15B 1/02* (2006.01)
*F25B 40/02* (2006.01)

(52) U.S. Cl.
CPC .............. *F24F 1/46* (2013.01); *F25B 41/003* (2013.01); *F04B 39/0207* (2013.01); *F15B 1/025* (2013.01); *F25B 13/00* (2013.01); *F25B 40/02* (2013.01); *F25B 2400/06* (2013.01); *F25B 2400/13* (2013.01); *Y02T 10/32* (2013.01)

(56) References Cited

U.S. PATENT DOCUMENTS

| | | | | |
|---|---|---|---|---|
| 6,155,075 | A * | 12/2000 | Hanson | F25B 39/02 62/509 |
| 10,077,910 | B2 * | 9/2018 | Lee | F24F 1/36 |
| 2004/0226306 | A1 * | 11/2004 | Wakuda | B60H 1/00735 62/160 |
| 2013/0061616 | A1 | 3/2013 | Zhang et al. | |
| 2014/0102131 | A1 * | 4/2014 | Okamoto | F25B 1/10 62/510 |
| 2018/0156507 | A1 * | 6/2018 | Gill | F25B 30/06 |

FOREIGN PATENT DOCUMENTS

| | | |
|---|---|---|
| JP | 2001-149623 A | 12/2001 |
| JP | 2002-310518 A | 10/2002 |
| JP | 2004-293856 A | 10/2004 |
| JP | 2012-013302 A | 1/2012 |
| JP | 2013-050283 A | 3/2013 |
| KR | 10-2005-0075145 A | 7/2005 |
| KR | 10-2010-0036789 A | 4/2010 |

OTHER PUBLICATIONS

Japanese Office Action dated Apr. 3, 2018 issued in corresponding JP Application 2014-237143.

International Search Report (PCT/ISA/210) issued in PCT Application No. PCT/JP2015/082457 dated Feb. 16, 2016 with English translation (five pages).

Japanese-language Written Opinion (PCT/ISA/237) issued in PCT Application No. PCT/JP2015/082457 dated Feb. 16, 2016 (four pages).

Chinese Office Action dated Apr. 10, 2019 in corresponding CN Application 201580055122.3.

Office Action issued to corresponding Korean Patent Application No. 10-2017-7013679 dated Aug. 30, 2018, citing the art listed above.

* cited by examiner

US 10,591,171 B2

HEAT PUMP

TECHNICAL FIELD

The present invention relates to a heat pump and, for example, to an engine-driven heat pump using a gas engine etc. and an electrically-driven heat pump.

BACKGROUND ART

Conventional refrigerating apparatuses include an apparatus described in Japanese Laid-Open Patent Publication No. 2002-310518 (Patent Document 1). This refrigerating apparatus includes a compressor, a condenser, an evaporator, and a subcooler, and the subcooler is made up of a plate type heat exchanger, a shell-and-tube heat exchanger, etc. This refrigerating apparatus is provided with the subcooler and is thereby increased in heat exchange capacity and in refrigeration efficiency.

PATENT DOCUMENT

Patent Document 1: JP 2002-310518 A

SUMMARY OF THE INVENTION

Problem to be Solved by the Invention

The present inventor found the following problems in a heat pump having a subcooler (the following description is not a conventional art and cannot be cited for denial of patentability of the present invention).

To increase a cooling performance during cooling, a plate type heat exchanger with a large heat exchange capacity and high cooling efficiency is adopted as a subcooler in some cases. Additionally, a heat pump may be provided with an accumulator for separating a gaseous refrigerant and an atomized refrigerant.

However, in this case, since the volume of the accumulator is large and the volume of the plate type heat exchanger is also large, the heat pump increases in size unless the accumulator and the plate type heat exchanger are properly arranged. However, a method of compactly arranging the accumulator and the plate heat exchanger is not known.

If a receiver storing a liquid refrigerant is provided, a subcooler can be disposed in the receiver if the subcooler is not a plate type heat exchanger. However, if a plate type heat exchanger having a large volume is adopted as the subcooler, the subcooler cannot be disposed in the receiver, and the heat pump must further have a receiver with a large volume disposed in a space other than the space for arranging the accumulator and the plate type heat exchanger. However, a method of compactly arranging the receiver, the accumulator, and the plate type heat exchangers is not known.

If an oil separator separating a lubricating oil of a compressor from a refrigerant gas is provided, a space for disposing the oil separator having a large volume is required. However, a method of compactly arranging the receiver, the accumulator, the oil separator, and the plate heat exchanger is not known.

Therefore, a problem to be solved by the present invention is to provide a compact heat pump when the subcooler is a plate type heat exchanger.

Means for Solving Problem

To solve the problem, a heat pump according to an aspect of the present invention is a heat pump having an outdoor unit which houses a receiver, an accumulator, an oil separator, and a subcooler in a package, in the outdoor unit, the subcooler provided in a liquid refrigerant path of a refrigerant flow downstream of the receiver, the accumulator provided in an intake path of a compressor, and the oil separator provided in a discharge path of the compressor, wherein the subcooler is a plate type heat exchanger, and two members of the receiver, the accumulator, the oil separator, and the subcooler are arranged on a straight line inclined to one side in a width direction of the outdoor unit with respect to a depth direction of the outdoor unit in a planar view, and the remaining two members of the receiver, the accumulator, the oil separator, and the subcooler are arranged on a straight line inclined to the other side in the width direction of the outdoor unit with respect to the depth direction of the outdoor unit in the planar view, and each of the two members on the straight line inclined to the one side is adjacent to each of the remaining two members in the planar view.

A heat pump according to another aspect of the present invention is a heat pump comprising an outdoor unit housing in a package a subcooler provided in a refrigerant flow downstream of a receiver and an accumulator provided in an intake path of a compressor, wherein the subcooler is a plate type heat exchanger, and the accumulator is located between the compressor and the subcooler in a width direction of the outdoor unit in a planar view, and the subcooler overlaps with the accumulator in the width direction of the outdoor unit in the planar view.

Effect of the Invention

According to the present invention, a compact heat pump can be achieved when the subcooler is a plate type heat exchanger.

EMBODIMENTS FOR CARRYING OUT THE INVENTION

Figure 1:
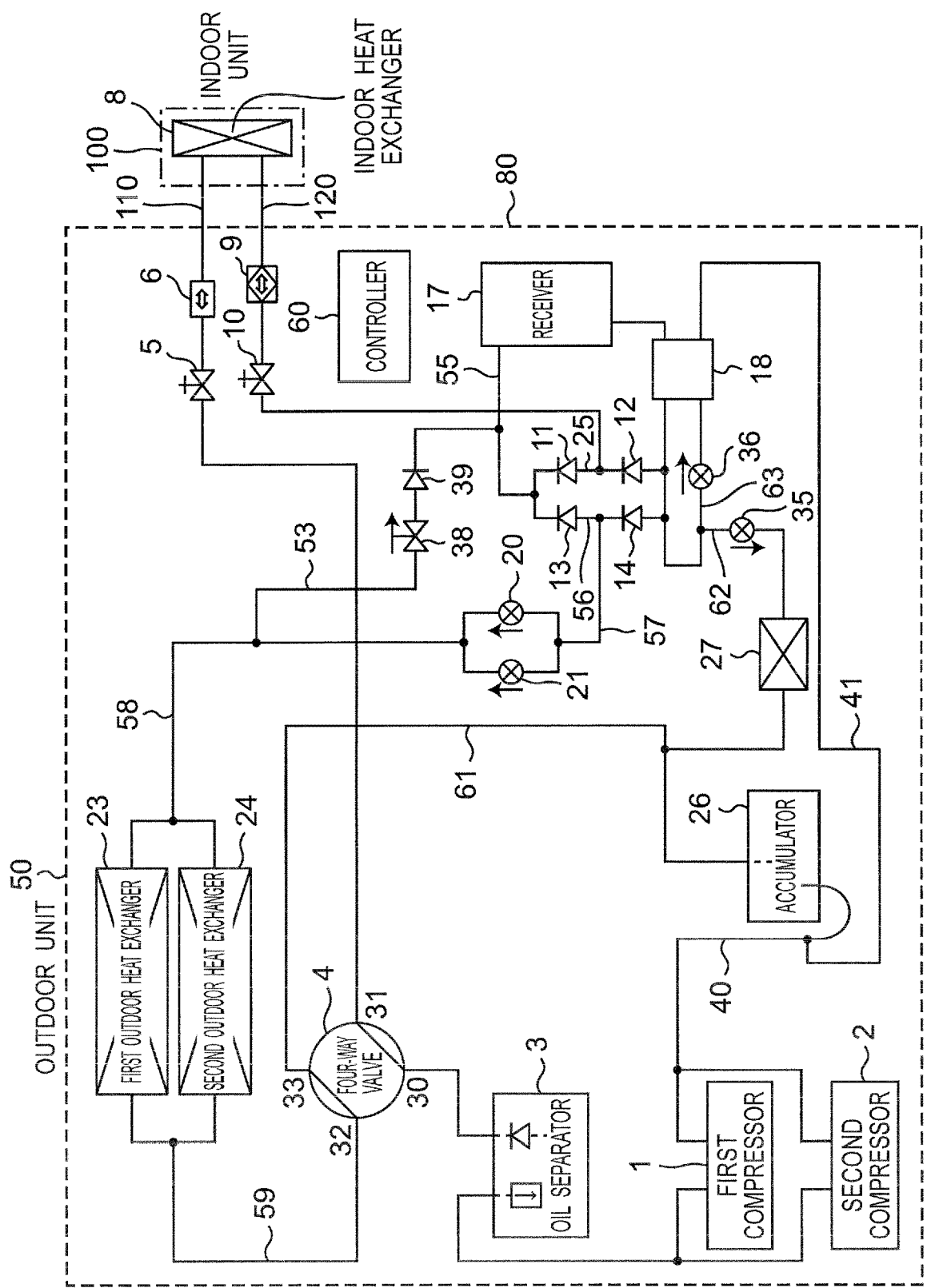
FIG. 1 is a simplified refrigerant circuit diagram of a gas-engine-driven heat pump according to an embodiment of the present invention.

A heat pump according to an aspect of the present invention is a heat pump having an outdoor unit which houses a receiver, an accumulator, an oil separator, and a subcooler in a package, in the outdoor unit, the subcooler provided in a liquid refrigerant path of a refrigerant flow downstream of the receiver, the accumulator provided in an intake path of a compressor, and the oil separator provided in a discharge path of the compressor, wherein the subcooler is a plate type heat exchanger, and two members of the receiver, the accumulator, the oil separator, and the subcooler are arranged on a straight line inclined to one side in a width direction of the outdoor unit with respect to a depth direction of the outdoor unit in a planar view, and the remaining two members of the receiver, the accumulator, the oil separator, and the subcooler are arranged on a straight line inclined to the other side in the width direction of the outdoor unit with respect to the depth direction of the outdoor unit in the planar view, and each of the two members on the straight line inclined to the one side is adjacent to each of the remaining two members in the planar view.

The planar view is defined as a field of view (range of view) when the receiver, the accumulator, the oil separator, and the subcooler are viewed from directly above (the upper side) while the outdoor unit of the heat pump is placed on the horizontal plane in a posture in a usage state.

The requirement of arrangement on the straight line is satisfied as long as any portion of a member overlaps with the straight line in the planar view.

Hereinafter, when a wording (expression) related to height such as a horizontal direction, a vertical direction, and a height direction is used in this description, the wording refers to a direction etc. in the state of the outdoor unit placed on the horizontal plane in a posture in a usage state.

According to an embodiment of the present invention, the four members having large volumes can densely be arranged in a rectangular space in the planar view. Therefore, the compact outdoor unit can be achieved. By arranging the plate type heat exchanger in a gap when the receiver, the accumulator, and the oil separator are provided, the space can efficiently be utilized.

A heat pump according to another aspect of the present invention is a heat pump comprising an outdoor unit housing in a package a subcooler provided in a refrigerant flow downstream of a receiver and an accumulator provided in an intake path of a compressor, wherein the subcooler is a plate type heat exchanger, and the accumulator is located between the compressor and the subcooler in a width direction of the outdoor unit in a planar view, and the subcooler overlaps with the accumulator in the width direction of the outdoor unit in the planar view.

In this description, overlapping in the width direction means overlapping when viewed in the width direction, and overlapping in the depth direction means overlapping when viewed in the depth direction.

The planar view is defined as a field of view (range of view) when the accumulator and the subcooler are viewed from directly above (the upper side) while the outdoor unit of the heat pump is placed on the horizontal plane in a posture in a usage state. The width direction is defined as the direction in which a power source of the outdoor unit such as a gas engine is disposed adjacent to the outdoor unit.

According to the other aspect of the present invention, the subcooler is disposed on the side opposite to the compressor with respect to the accumulator in the width direction so as to overlap with the accumulator in the width direction in the planar view. Therefore, the space tending to be a dead space can effectively be utilized on the side opposite to the compressor in the width direction with respect to the accumulator with a large volume. Thus, even though a plate type heat exchanger with a large volume is adopted as the subcooler, the compact outdoor unit can be achieved.

The present invention will now be described in detail with a shown embodiment.

FIG. 1 is a simplified refrigerant circuit diagram of a gas-engine-driven heat pump according to an embodiment of the present invention.

As shown in FIG. 1, this heat pump includes an outdoor unit 50, an indoor unit 100, a gas refrigerant pipe 110, and a liquid refrigerant pipe 120. This heat pump also includes a controller 60 for the outdoor unit 50. A dotted line denoted by 80 of FIG. 1 indicates a package of the outdoor unit 50. As shown in FIG. 1, the gas refrigerant pipe 110 and the liquid refrigerant pipe 120 each connect the outdoor unit 50 and the indoor unit 100.

The outdoor unit 50 includes a first compressor 1, a second compressor 2, an oil separator 3, a four-way valve 4, a gas-side stop valve 5, a gas-side filter 6, a liquid-side filter 9, a liquid-side stop valve 10, a first check valve 11, a second check valve 12, a third check valve 13, a fourth check valve 14, a receiver 17, and a subcooler 18. The outdoor unit 50 also includes a first electronic expansion valve 20, a second electronic expansion valve 21, a first outdoor heat exchanger 23, a second outdoor heat exchanger 24, an accumulator 26, a sub-evaporator (refrigerant auxiliary evaporator) 27, a third electronic expansion valve 35, a fourth electronic expansion valve 36, an electromagnetic valve 38, and a fifth check valve 39. On the other hand, the indoor unit 100 has an indoor heat exchanger 8.

The controller 60 outputs control signals to the first compressor 1, the second compressor 2, the four-way valve 4, the first electronic expansion valve 20, the second electronic expansion valve 21, the third electronic expansion valve 35, the fourth electronic expansion valve 36, and the electromagnetic valve 38 to control these devices. Although not shown, the controller 60 is electrically connected through a signal line to each of these devices.

As shown in FIG. 1, the first compressor 1, the second compressor 2, the gas-side stop valve 5, the liquid-side stop valve 10, the gas-side filter 6, and the liquid-side filter 9 are provided in the package 80 of the outdoor unit 50. The receiver 17, the accumulator 26, the oil separator 3, and the subcooler 18 are also provided in the package 80 of the outdoor unit 50.

The first compressor 1, the second compressor 2, the gas-side stop valve 5, the liquid-side stop valve 10, the gas-side filter 6, and the liquid-side filter 9 are arranged in the same chamber defined by the package 80. The receiver 17, the accumulator 26, the oil separator 3, and the subcooler 18 are also arranged in the same chamber described above. The package 80 is a case made up of a plurality of outer plates, for example.

As shown in FIG. 1, the first compressor 1 and the second compressor 2 are arranged in parallel, and lines on the discharge side of the first and second compressors 1, 2 are connected to a refrigerant inlet of the oil separator 3. The oil separator 3 is provided in a discharge path of the compressors 1, 2. The refrigerant outflow side of the oil separator 3 is connected to a first port 30 of the four-way valve 4. A second port 31 of the four-way valve 4 is connected via the gas-side stop valve 5 and gas-side filter 6 to a port on the gas side of the indoor heat exchanger 8. The gas-side filter 6 is disposed on the indoor unit 100 side relative to the gas-side stop valve 5 and inside the package 80 of the outdoor unit 50.

A port on the liquid side of the indoor heat exchanger 8 is connected through the liquid-side filter 9 and the liquid-side stop valve 10 to a line 25 connecting a port on the refrigerant outflow side of the first check valve 11 and a port on the refrigerant inflow side of the second check valve 12. The liquid-side filter 9 is disposed on the indoor unit 100 side relative to the liquid-side stop valve 10 and inside the package 80 of the outdoor unit 50. A port on the refrigerant outflow side of the first check valve 11 is connected through a line 55 to a port on the refrigerant inflow side of the receiver 17. A port on the refrigerant outflow side of the receiver 17 is connected through the subcooler 18 to respective ports on the refrigerant inflow side of the second and fourth check valves 12, 14. The subcooler 18 is provided in a liquid refrigerant path of a refrigerant flow downstream of the receiver 17.

As shown in FIG. 1, a port on the refrigerant outflow side of the fourth check valve 14 and a port on the refrigerant inflow side of the third check valve 13 are connected by a line 56. The first and second electronic expansion valves 20, 21 are connected in parallel to a line 57 branched from the line 56. The first and second outdoor heat exchangers 23, 24 are connected in parallel to a line 58 led out from a side of the first and second electronic expansion valves 20, 21 different from the side connected to the check valves 13, 14. The first and second electronic expansion valves 20, 21 are connected in series to the first and second outdoor heat exchangers 23, 24.

A line 59 led out from a side of the first and second outdoor heat exchangers 23, 24 different from the side connected to the electronic expansion valves 20, 21 is connected to a third port 32 of the four-way valve 4. As shown in FIG. 1, a fourth port 33 of the four-way valve 4 is connected to the accumulator 26. The accumulator 26 is connected to the intake side of the compressors 1, 2. The accumulator 26 is provided in an intake path of the compressors 1, 2.

The port on the refrigerant inflow side of the fourth check valve 14 is connected via the third electronic expansion valve 35 to the sub-evaporator 27. A side of the sub-evaporator different from the side connected to the fourth check valve 14 is connected to a line 61 connecting the fourth port 33 of the four-way valve and the accumulator 26.

A new line 63 is branched from the line 62 connecting the port on the refrigerant inflow side of the fourth check valve 14 and the third electronic expansion valve 35. The branched line 63 is connected through the fourth electronic expansion valve 36 to the subcooler 18. As shown in FIG. 1, the subcooler 18 is directly connected through a line 41 to a line 40 connecting the accumulator 26 and the compressors 1, 2. The refrigerant passing through the subcooler 18 passes through the subcooler 18 and then flows through the line 41 toward the compressors 1, 2.

As shown in FIG. 1, the line 58 connecting the outdoor heat exchangers 23, 24 and the electronic expansion valves 20, 21 is branched, and a line 53 branched from the line 58 is connected to the line 55 connecting the first and third check valves 11, 13 to the receiver 17. The electromagnetic valve 38 and the fifth check valve 39 are arranged on the path of the branched line 53. As shown in FIG. 1, the electromagnetic valve 38 is located closer than the fifth check valve 39 to the outdoor heat exchangers 23, 24 on the line 53. The controller 60 controls the electromagnetic valve 38 to a fully-opened or fully-closed state.

In the configuration described above, this heat pump performs cooling and heating operations as follows.

First, in the heating operation, the controller 60 controls the four-way valve 4 to connect the first port 30 and the second port 31 of the four-way valve 4 and connect the third port 32 and the fourth port 33.

In the heating operation, the high pressure refrigerant gas discharged from the compressors 1 and 2 first flows into the oil separator 3. The oil separator 3 separates a lubricating oil of the compressors 1, 2 from the refrigerant gas. Although not described in detail, the lubricating oil separated from the refrigerant gas by the oil separator 3 is returned to the compressors 1, 2 through a line not shown.

After passing through the oil separator 3, the refrigerant gas passes through the four-way valve 4, the gas-side stop valve 5, and the gas-side filter 6 in this order and flows into the indoor heat exchanger 8. The gas-side stop valve 5 is a valve manually opened and closed (by using a tool in some cases). The gas-side stop valve 5 is closed mainly when the outdoor unit 50 is connected to the indoor unit 100 at the time of installation. The gas-side stop valve 5 plays a role of preventing a foreign matter from the outside from entering the outdoor unit 50 at the time of installation. The gas-side filter 6 plays a role of removing a foreign matter from the outside at the time of installation. The gas-side filter 6 is provided for protecting the outdoor unit 50.

The gas refrigerant gives heat to the indoor heat exchanger 8 and thereby liquefies itself into a liquid refrigerant. Subsequently, the liquid refrigerant flows via the liquid-side filter 9, the liquid-side stop valve 10, and the first check valve 11 in this order into the receiver 17. The liquid-side stop valve 10 is a valve manually opened and closed (by using a tool in some cases). The liquid-side stop valve 10 is closed mainly when the outdoor unit 50 is connected to the indoor unit 100 at the time of installation. The liquid-side stop valve 10 plays a role of preventing a foreign matter from the outside from entering the outdoor unit 50 at the time of installation. The liquid-side filter 9 plays a role of removing a foreign matter from the outside at the time of installation. The liquid-side filter 9 is provided for protecting the outdoor unit 50.

The receiver 17 plays a role of storing the liquid refrigerant. Subsequently, the liquid refrigerant goes through the bottom of the receiver 17, passes through the subcooler 18, runs through the fourth check valve 14, and flows toward the first and second electronic expansion valves 20, 21.

The pressure of the liquid refrigerant coming out from the bottom of the receiver 17 becomes lower due to a pressure loss through a path than the pressure of the liquid refrigerant on the outflow side of the second check valve 12 and the pressure of the liquid refrigerant on the outflow side of the first and third check valves 11, 13. As a result, basically, the liquid refrigerant going through the bottom of the receiver 17 does not pass through the second check valve 12 and the third check valve 13.

Subsequently, the liquid refrigerant is expanded by the first and second electronic expansion valves 20, 21 and is sprayed and atomized. The opening degrees of the first and second electronic expansion valves 20, 21 are freely controlled by the controller 60. The pressure of the refrigerant is high before passing through the first and second electronic expansion valves 20, 21 and becomes low after passing through the first and second electronic expansion valves 20, 21.

Subsequently, the atomized damp liquid refrigerant exchanges heat with outside air through the first and second outdoor heat exchangers 23, 24 and gasifies due to the heat given from the outside air. In this way, while the refrigerant imparts heat to the indoor heat exchanger 8, heat is imparted from the outdoor heat exchangers 23, 24. Subsequently, the gasified refrigerant passes through the four-way valve 4 and reaches the accumulator 26. The accumulator 26 separates the gaseous refrigerant and the atomized refrigerant and fully gasifies the refrigerant. If the refrigerant remaining in the atomized state returns to the compressors 1, 2, sliding parts of the compressors 1, 2 may be damaged. The accumulator 26 also plays a role of preventing such a situation. Subsequently, the refrigerant gas passing through the accumulator 26 flows into intake ports of the compressors 1, 2.

If the third electronic expansion valve 35 is partially or completely opened under the control of the controller 60, a portion of the liquid refrigerant passing through the subcooler 18 is atomized by the third electronic expansion valve 35 before flowing into the sub-evaporator 27. To the sub-evaporator 27, warm cooling water (cooling water at 60° C. to 90° C.) of the gas engine is introduced.

The atomized liquid refrigerant flowing into the sub-evaporator 27 indirectly exchanges heat with the warm cooling water and becomes a gas before reaching the accumulator 26. In this way, the performance of giving and receiving heat is improved. It is noted the when the heating operation is performed, the fourth electronic expansion valve 36 is controlled to be fully closed.

On the other hand, in the cooling operation, the controller 60 controls the four-way valve 4 to connect the first port 30 and the third port 32 of the four-way valve 4 and connect the second port 31 and the fourth port 33. A flow of heat in the case of cooling will hereinafter simply be described.

In the case of the cooling operation, the gas refrigerant discharged from the first and second compressors 1, 2 passes through the oil separator 3; then passes through the four-way valve 4, and reaches the first and second outdoor heat exchangers 23, 24. In this case, since the temperature of the refrigerant is high, the refrigerant is cooled even with an intensely hot summer air (air at 30 to 40 degrees C.) by the first and second outdoor heat exchangers 23, 24. The gas refrigerant is deprived of heat by the first and second outdoor heat exchangers 23, 24, turning into a liquid refrigerant.

During the cooling operation, the controller 60 controls the opening degrees of the first and second electronic expansion valves 20, 21 to an appropriate opening degree and controls the electromagnetic valve 38 to be fully opened. The liquid refrigerant passing through the first and second outdoor heat exchangers 23, 24 basically passes through the electromagnetic valve 38 and the check valve 39 and reaches the receiver 17. Subsequently, the liquid refrigerant goes through the bottom of the receiver 17, passes through the subcooler 18, and flows from between the second check valve 12 and the first check valve 11 toward the liquid-side stop valve 10.

Subsequently, the liquid refrigerant flows via the liquid-side stop valve 10 and the liquid-side filter 9 into the indoor heat exchanger 8. The low temperature liquid refrigerant flowing into the indoor heat exchanger 8 draws heat from the indoor heat exchanger 8 to cool a room air while gasifying due to the heat given from the indoor heat exchanger 8. In this way, the refrigerant draws heat from the indoor heat exchanger 8 while releasing heat to the first and second outdoor heat exchangers 23, 24. Subsequently, the gasified gas refrigerant passes through the gas-side filter 6, the gas-side stop valve 5, the four-way valve 4, and the accumulator 26 in this order and flows into the intake ports of the compressors 1, 2.

When the controller 60 receives a signal from a remote control operation by a user via a controller (not shown) and a signal line (not shown) of the indoor unit 100 in hot summer season etc., the controller 60 controls the opening degree of the fourth electronic expansion valve 36 to an appropriate opening degree. As a result, a portion of the liquid refrigerant passing through the receiver 17 and the subcooler 18 is cooled by passing through the fourth electronic expansion valve 36 and flows into the subcooler 18. In this way, heat is exchanged between the liquid refrigerant flowing from the receiver 17 into the subcooler 18 without passing through the fourth electronic expansion valve 36 and the liquid refrigerant passing through the fourth electronic expansion valve 36 and flowing into the subcooler 18. As a result, while the liquid refrigerant sent to the indoor heat exchanger 8 is further cooled, the liquid refrigerant passing through the fourth electronic expansion valve 36 is warmed and gasified before being allowed to flow toward the compressors 1, 2. The subcooler 18 is a plate type heat exchanger. This heat pump is improved in cooling performance by adopting a plate type heat exchanger with a large heat exchange capacity as the subcooler 18.

Figure 2:
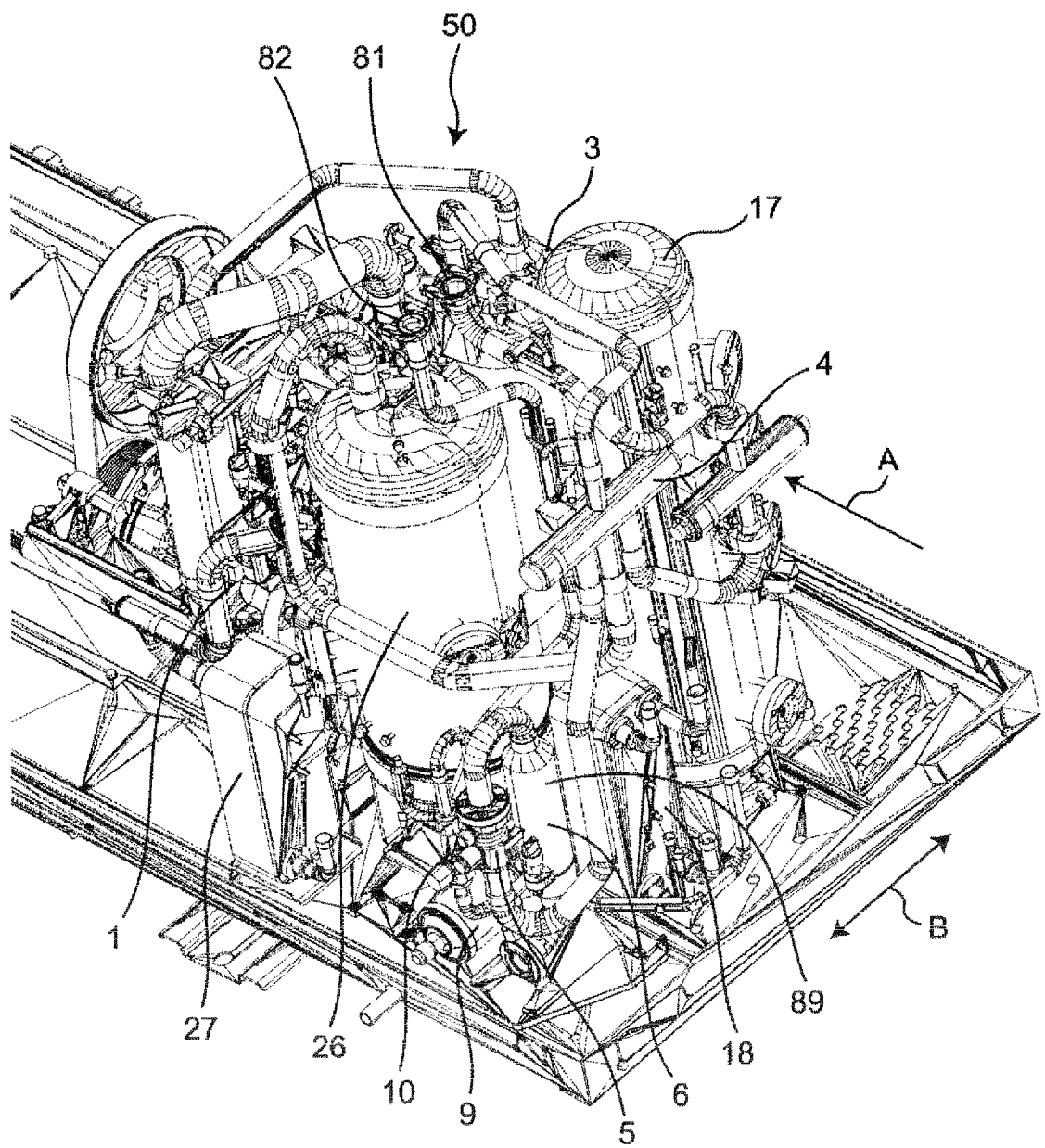
FIG. 2 is a perspective view of an outdoor unit with a package removed and is a perspective view of a portion of an internal structure of the outdoor unit.

FIG. 2 is a perspective view of an outdoor unit 50 with the package 80 removed and is a perspective view of a portion of an internal structure of the outdoor unit 50.

In this perspective view, the oil separator 3, the receiver 17, and the four-way valve 4 are located on the far side of the plane of FIG. 2, while the sub-evaporator 27, the accumulator 26, the one compressor 1 of the two compressors, the liquid-side stop valve 10, the liquid-side filter 9, the gas-side stop valve 5; and the gas-side filter 6 are located on the near side of the plane of FIG. 2.

In FIG. 2, reference numeral 81 denotes an oval flange (oval flange) for connecting the line from the four-way valve 4 to the outdoor heat exchangers 1, 2 (not shown in FIG. 2) disposed on a second floor, and reference numeral 82 denotes an oval flange for connecting the lines from the outdoor heat exchangers 1, 2 to the receiver 17 side. The gas engine (not shown) is disposed on one side in the width direction of the outdoor unit 50 indicated by an arrow A of FIG. 2 relative to the accumulator 26 (the width direction mentioned in the following description refers to the width direction of the outdoor unit 50).

Figure 3:
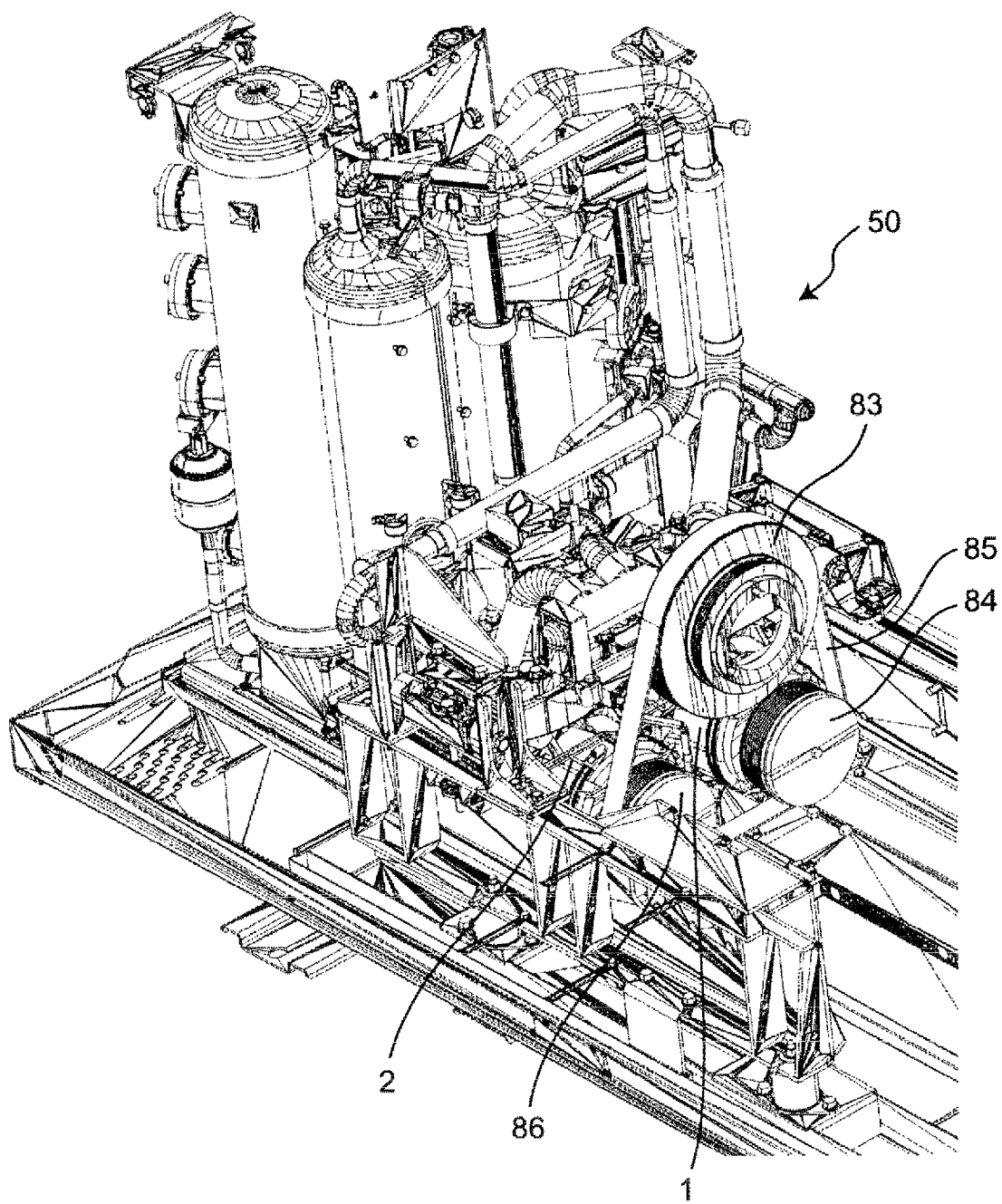
FIG. 3 is a perspective view of a portion of the outdoor unit with the package removed when viewed from a gas engine mounting side.

FIG. 3 is a perspective view of a portion of the outdoor unit 50 with the package 80 removed when viewed from a gas engine mounting side.

In FIG. 3, reference numeral 83 denotes a flywheel of the gas engine; reference numeral 84 denotes an electromagnetic clutch connecting and discontenting a power to the first compressor 1; reference numeral 85 denotes a winding belt; and reference numeral 86 denotes an electromagnetic clutch connecting and discontenting a power to the second compressor 2. As shown in FIG. 3, the winding belt 85 is wound around the flywheel 83, the electromagnetic clutch 84, and the electromagnetic clutch 86. The rotating power of the gas engine is transmitted through the flywheel 83 and the winding belt 85 to the electromagnetic clutches 84, 86 and the rotating power is transmitted from the electromagnetic clutches 84, 86 to the compressors 1, 2.

Figure 4:
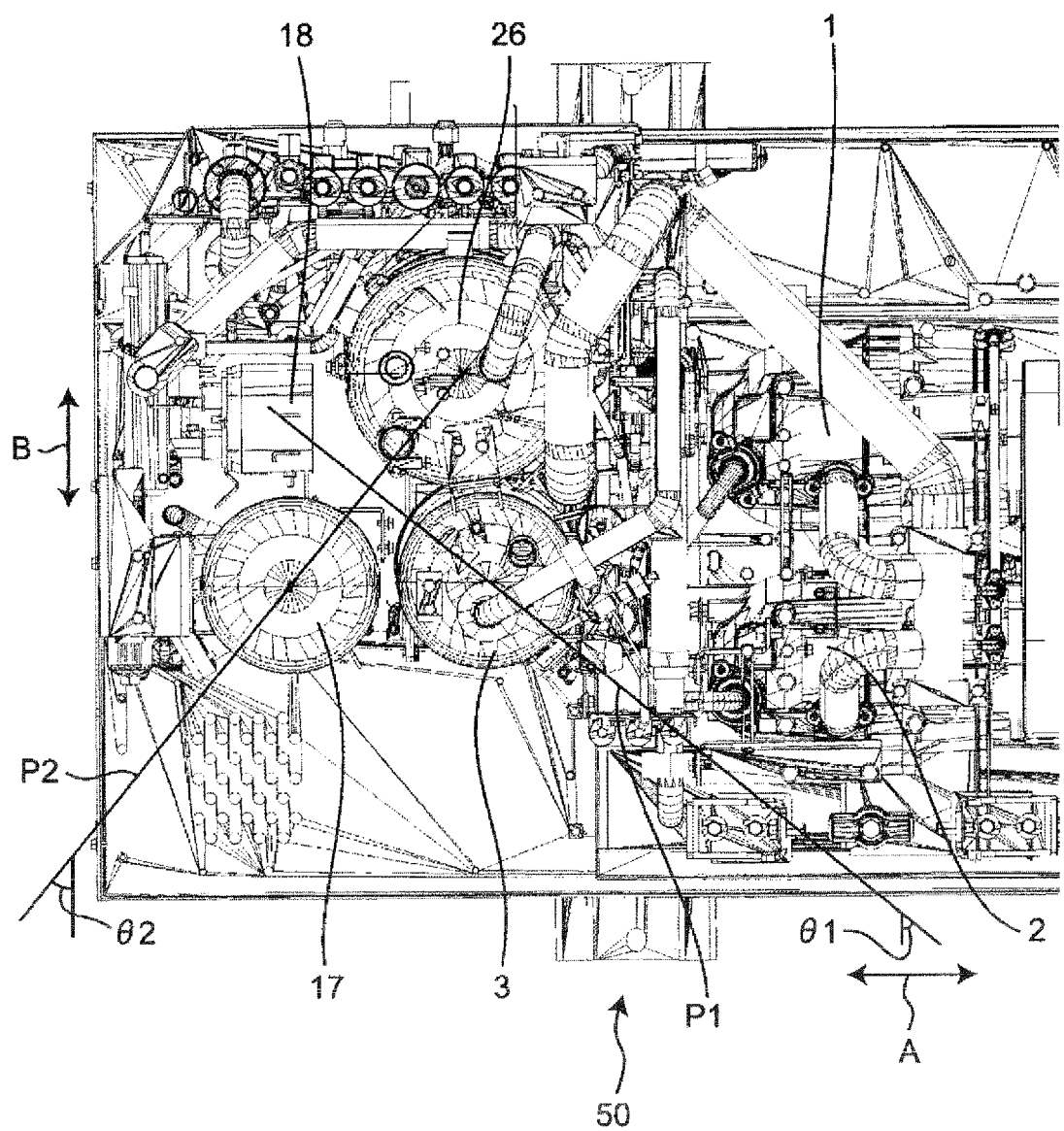
FIG. 4 is a plane view of the outdoor unit with the package removed and is a view of a receiver, an accumulator, an oil separator, and a subcooler viewed from directly above (the upper side) in the outdoor unit with the package removed.

FIG. 4 is a plane view of the outdoor unit 50 with the package 80 removed and is a view of the receiver 17, the accumulator 26, the oil separator 3, and the subcooler 18 viewed from directly above (upper side) in the outdoor unit 50 with the package 80 removed.

In FIG. 4, 1 denotes the first compressor, 2 denotes the second compressor, and 26 denotes the accumulator. In FIG. 4, 3 denotes the oil separator, 17 denotes the receiver, and 18 denotes the subcooler (the plate type heat exchanger). An arrow A indicates the width direction, and an arrow B indicates the depth direction of the outdoor unit 50 (the depth direction mentioned in the following description refers to the depth direction of the outdoor unit 50).

As shown in FIG. 4, in a planar view, the oil separator 3 and the subcooler 18 are located on a straight line P1 inclined to one side in the width direction with respect to the depth direction. In the planar view, the straight line P1 is inclined by θ1[°] (θ1<90[°]) to one side in the width direction.

Additionally, in the planar view, the accumulator 26 and the receiver 17 are located on a straight line P2 inclined to the other side in the width direction with respect to the depth direction. In the planar view, the straight line P2 is inclined by θ2[°] (θ2<90[°]) to the other side in the width direction. In the planar view, each of the oil separator 3 and the subcooler 18 on the straight line P1 is disposed adjacent to each of the accumulator 26 and the receiver 17. In the planar view, the straight line P1 intersects with the straight line P2 between the accumulator 26 and the receiver 17.

In the planar view, with regard to the subcooler 18, the accumulator 26 is located between the subcooler 18 and the compressors 1, 2 in the width direction. In the planar view, the subcooler 18 overlaps with the accumulator 26 in the width direction.

In the planar view, the accumulator 26, the oil separator 3, and the receiver 17 each have a circular shape, and the subcooler 18 has a rectangular shape. In the planar view, the area occupied by the accumulator 26 is larger than the area occupied by the receiver 17 and larger than the area occupied by the oil separator 3. In planar view, the area occupied by the accumulator 26 is larger than the area occupied by the subcooler 18.

In the planar view, the area occupied by the receiver 17 is substantially equal to the area occupied by the oil separator 3. In the planar view, the area occupied by the subcooler 18 is smaller than the area occupied by the receiver 17 and smaller than the area occupied by the oil separator 3.

In the planar view, the oil separator 3 has a portion overlapping with the accumulator 26 in the depth direction, and the subcooler 18 has a portion overlapping with the receiver 17 in the depth direction. In the planar view, the receiver 17 has a portion overlapping with the oil separator 3 in the width direction.

In the planar view, the accumulator 26 and the oil separator 3 face the compressors 1, 2 in the width direction. In the planar view, the receiver 17 and the subcooler 18 are located on the side opposite to the compressors 1, 2 with respect to the accumulator 26 and the oil separator 3 in the width direction. In the planar view, the straight line connecting the center of the circular oil separator 3 and the center of the circular receiver 17 is substantially parallel to the width direction.

In the planar view, the accumulator 26, the oil separator 3, and the receiver 17 are arranged to draw an L shape. In the planar view, the subcooler 18 is arranged in the space partitioned by the L shape.

According to the embodiment, since the subcooler 18 is a plate-type heat exchanger, the heat exchange capacity can be increased and the cooling performance can be made excellent.

According to the above embodiment, the receiver 17, the accumulator 26, the oil separator 3, and the subcooler 18 having large volumes can densely be arranged in a rectangular region in the planar view. Therefore, the compact outdoor unit can be achieved. By arranging the subcooler 18 in a gap when the receiver 17, the accumulator 26, and the oil separator 3 are provided, the space can efficiently be utilized.

According to the embodiment, the subcooler 18 is disposed on the side opposite to the compressors 1, 2 with respect to the accumulator 26 in the width direction so as to overlap with the accumulator 26 in the width direction of the outdoor unit 50 in the planar view. Therefore, the space tending to be a dead space can effectively be utilized on the side opposite to the compressors in the width direction with respect to the accumulator 26 with a large volume. Thus, even though a plate type heat exchanger with a large volume is adopted as the subcooler 18, the compact outdoor unit 50 can be achieved.

By adjacently arranging the accumulator 26 having the largest size and the subcooler 18 having the smallest size in the width direction in the planar view and adjacently arranging the two members intermediate in size, i.e., the receiver 17 and the accumulator 26, in the width direction, the receiver 17, the accumulator 26, the oil separator 3, and the subcooler 18 can densely be arranged in the rectangular region.

In the present invention, the receiver, the accumulator, the oil separator, and the subcooler may be arranged in two rows and two columns in a rectangular space in the planar view, and the receiver, the accumulator, the oil separator, and the subcooler may each be disposed at any position in regions around the four corners of the rectangular region in the planar view. For example, in the arrangement of the embodiment shown in FIG. 4, the arrangement positions of the oil separator and the receiver may be interchanged. The arrangement of the receiver, the accumulator, the oil separator, and the subcooler may be any pattern of arrangement out of possible 4! (the factorial of 4)=24 combinations, and the embodiment is shown as merely one of the 24 patterns of arrangement. Out of the 24 patterns of arrangement, the patterns of arrangement with the accumulator and the subcooler overlapping with each other in the width direction or in the depth direction are preferable because a large member and a small member are adjacent to each other in the planar view so that a small arrangement space can be achieved. Out of the 24 patterns of arrangement, the four patterns of arrangement with the accumulator and the oil separator disposed on the side closer to the compressors (two combinations for disposing the accumulator and the oil separator on the side closer to the compressors and two patterns of arrangement of the receiver and the subcooler for each of the two combinations, i.e., 2×2=4 patterns) are preferable since the length of piping can be made short.

Figure 5:
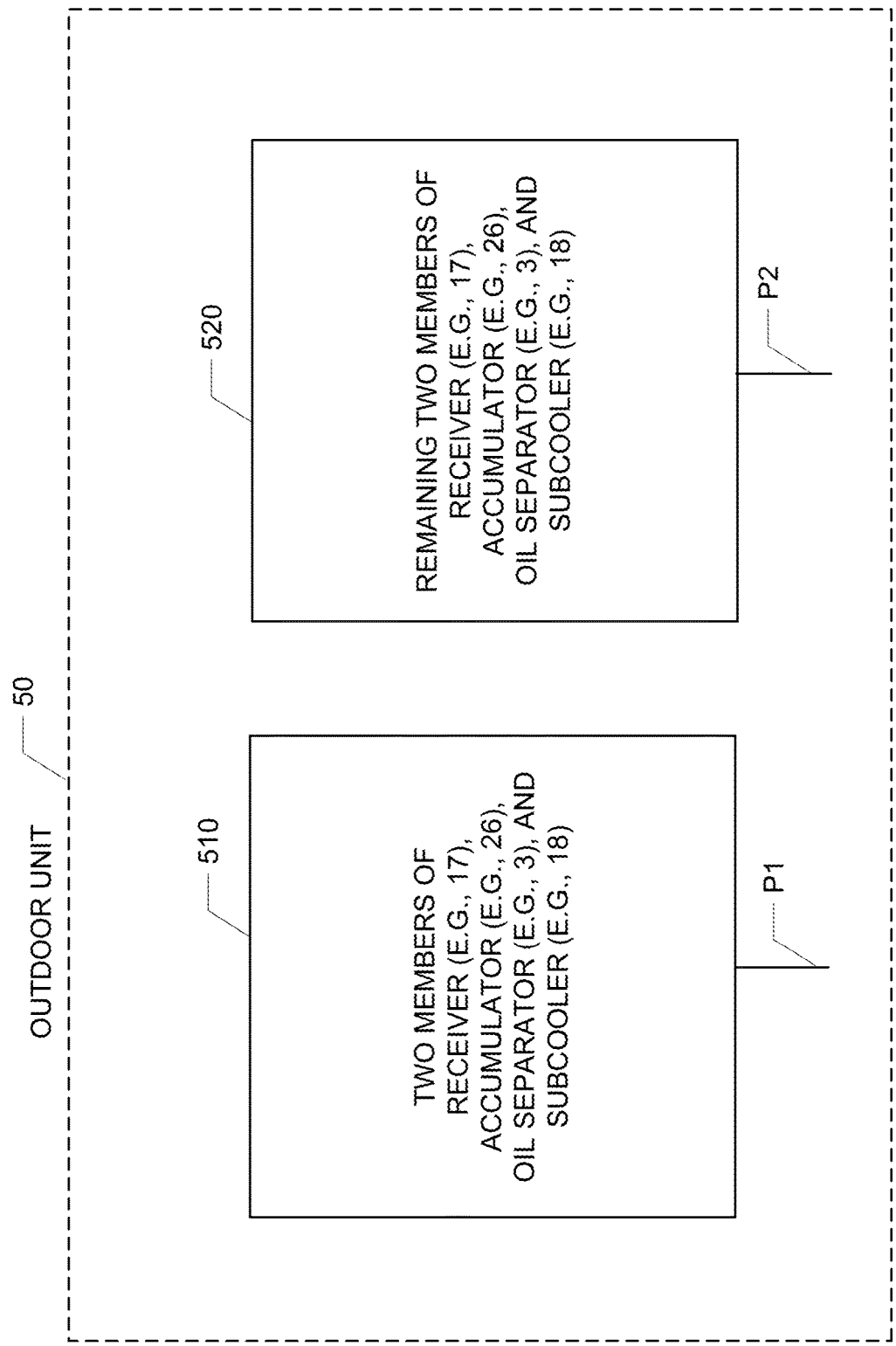
FIG. 5 is an illustrative block diagram of the outdoor unit.

Referring to FIG. 5, an illustrative block diagram of the outdoor unit 50 is shown. As shown in FIG. 5, outdoor unit 50 includes two members (510) of the receiver (17), the accumulator (26), the oil separator (3), and the subcooler (18) arranged on a straight line (P1) and the remaining two members (520) of the receiver (17), the accumulator (26), the oil separator (3), and the subcooler (18) are located on the other straight line (P2). It is noted that with reference to FIG. 5, lines P1 and P2 are for illustration and are not to be understood as depicting an inclination with respect a direction of the outdoor unit.

In any combinations, when two members of the receiver, the accumulator, the oil separator, and the subcooler are located on one straight line and the remaining two members of the receiver, the accumulator, the oil separator, and the subcooler are located on the other straight line in the planar view, the presence of the one and the other straight lines satisfying the condition of intersecting between the other two members is preferable because the four members can more densely be arranged.

In the embodiment, the straight line connecting the center of the circular oil separator 3 and the center of the circular receiver 17 is substantially parallel to the width direction in the planar view. However, in the present invention, the straight line connecting the center of the circular oil separator and the center of the circular receiver may neither be parallel to the depth direction nor parallel to the width direction in the planar view.

In the embodiment, the accumulator 26, the oil separator 3, and the receiver 17 each have a circular shape in the planar view, and the superheat heat exchanger 18 has a rectangular shape. However, in the present invention, one or more members of the accumulator, the oil separator, and the receiver may have a shape other than a circle in the planar view and may have a shape such as a polygon and an ellipse, for example. The superheat heat exchanger may have a shape other than a rectangle in the planar view and may have, for example, a polygonal shape other than a rectangle.

In the embodiment, the heat pump has the one outdoor unit 50 and the one indoor unit 100; however, in the present invention, the heat pump may have any number of one or more outdoor units and may have any number of one or more indoor units.

In the embodiment, the heat pump is a gas-engine-driven heat pump; however, the heat pump of the present invention may be a heat pump driven by an engine other than a gas engine, such as a diesel engine and a gasoline engine. The heat pump of the present invention may be an electrically-driven heat pump.

In the present invention, in comparison with the embodiment, one or more electrical components and parts can appropriately be omitted from the electrical components and parts constituting the embodiment. On the contrary, in the present invention, in comparison with the embodiment, a further electrical component or part can be added to the electrical components and parts constituting the embodiment.

In the present invention, a compressor power source such as an engine and an electric motor may be separated from a compressor by a sill so as to prevent the hot heat of the compressor power source from going to the refrigerant side, or a compressor power source such as an engine and an electric motor may not be separated from a compressor by a sill. Additionally, a new embodiment can obviously be constructed by combining two or more constituent elements out of all the constituent elements described in the embodiment and modification examples.

Although the present invention has been sufficiently described in terms of the preferable embodiment with reference to the accompanying drawings, various variations and modifications are apparent to those skilled in the art. It should be understood that such variations and modifications are included in the present invention without departing from the scope of the present invention according to appended claims.

The disclosures of description, drawings, and claims of Japanese Patent Application No. 2014-237143 filed on Nov. 21, 2014 are incorporated herein by reference in their entirety.

EXPLANATIONS OF REFERENCE OR NUMBERS 1 first compressor
2 second compressor
3 oil separator
4 four-way valve
6 gas-side filter
8 indoor heat exchanger
9 liquid-side filter
10 liquid-side stop valve
17 receiver
18 subcooler
20 first electronic expansion valve
21 second electronic expansion valve
23 first outdoor heat exchanger
24 second outdoor heat exchanger
26 accumulator
27 sub-evaporator
35 third electronic expansion valve
36 fourth electronic expansion valve
38 electromagnetic valve
50 outdoor unit
60 controller
80 package
100 indoor unit
110 gas refrigerant pipe
120 liquid refrigerant pipe

The invention claimed is:

1. A heat pump comprising:
an outdoor unit which includes and houses:
a receiver;
a subcooler provided in a liquid refrigerant path of a refrigerant flow downstream of the receiver;
an accumulator provided in an intake path of a compressor; and
an oil separator provided in a discharge path of the compressor,
wherein:
the subcooler comprises a plate type heat exchanger,
two members of a group comprising: the receiver, the accumulator, the oil separator, and the subcooler are arranged on a straight line inclined to a first side in a width direction of the outdoor unit with respect to a depth direction of the outdoor unit in a planar view,
a remaining two members of the group comprising: the receiver, the accumulator, the oil separator, and the subcooler are arranged on a straight line inclined to a second side in the width direction of the outdoor unit with respect to the depth direction of the outdoor unit in the planar view, and
the two members on the straight line inclined to the first side are adjacent to the remaining two members in the planar view.

2. The heat pump according to claim 1, wherein:
the two members comprise the oil separator and the subcooler; and
the remaining two members comprise the receiver and the accumulator.

3. The heat pump according to claim 1, wherein:
the straight line inclined to the first side is inclined by a first angle with respect to the first side of the outdoor unit; and
the straight line inclined to the second side is inclined by a second angle with respect to the first side of the outdoor unit.

4. The heat pump according to claim 3, wherein:
the outdoor unit comprises the first side, the second side opposite the first side, a third side, and a fourth side opposite the third side;
the receiver is positioned, along the straight line inclined to the first side, between the first side and the accumulator;
the oil separator is positioned, along the straight line inclined to the second side, between the subcooler and the third side;
the oil separator is positioned intermediate the third side and the accumulator;

the receiver is positioned intermediate the third side and the subcooler;

the receiver is positioned intermediate the oil separator and the first side; and the subcooler is positioned intermediate the accumulator and the first side.

5. The heat pump according to claim 1, wherein the accumulator is positioned between the compressor and the subcooler in the planar view.

6. The heat pump according to claim 1, wherein the oil separator is positioned between the receiver and the compressor in the planar view.

7. An outdoor unit of a heat pump, the outdoor unit comprising:
a compressor;
a receiver fluidically coupled to the compressor;
a subcooler provided in a liquid refrigerant path of a refrigerant flow downstream of the receiver, the subcooler comprising a plate type heat exchanger;
an accumulator provided in an intake flow path corresponding to the compressor;
an oil separator provided in a discharge flow path corresponding to the compressor;
wherein:
the oil separator and the subcooler are arranged in a straight line that is angularly disposed to a width of a heat pump unit and extends in a first direction; and
the receiver and accumulator are arranged in a straight line that is angularly disposed to the width of a heat pump unit and extends in a second direction that is opposite the first direction.

8. The heat pump according to claim 7, further comprising:
a housing; and
wherein the compressor, the receiver, the subcooler, the accumulator, and the oil separator are disposed within the housing.

9. The heat pump according to claim 7, wherein the accumulator is located between the compressor and the subcooler in the width of the outdoor unit in a planar view.

10. The heat pump according to claim 7, wherein:
the accumulator is provided downstream from the compressor in a flow path; and
the oil separator is provided upstream from the compressor in the flow path.

11. An outdoor unit of a heat pump, the outdoor unit comprising:
a compressor;
a receiver fluidically coupled to the compressor;
a subcooler provided in a liquid refrigerant path of a refrigerant flow downstream of the receiver, the subcooler comprising a plate type heat exchanger;
an accumulator provided in an intake flow path corresponding to the compressor;
an oil separator provided in a discharge flow path corresponding to the compressor;
wherein:
a first set of two components selected from a group consisting of: the receiver, the accumulator, the oil separator, and the subcooler are arranged in a straight line that is angularly disposed to a width of a heat pump unit and extends in a first direction;
a second set of two components selected from the group consisting of: the receiver, the accumulator, the oil separator, and the subcooler are arranged in a straight line that is angularly disposed to the width of a heat pump unit and extends in a second direction that is opposite the first direction; and
the second set of two components are different from the first set of two components.

12. The heat pump according to claim 11, further comprising a housing.

13. The heat pump according to claim 12, wherein the compressor, the receiver, the subcooler, the accumulator, and the oil separator are disposed within the housing.

14. The heat pump according to claim 11, wherein the accumulator, the oil separator, and the receiver are arranged in an L shape in a planar view.

15. The heat pump according to claim 11, wherein:
the first set of two components comprise the oil separator and the subcooler; and
the second set of two components comprise the receiver and the accumulator.

16. The heat pump according to claim 11, wherein:
the first set of two components comprise the accumulator and the subcooler; and
the second set of two components comprise the receiver and the oil separator.

17. The heat pump according to claim 11, wherein:
the first set of two components comprise the receiver and the subcooler; and
the second set of two components comprise the accumulator and the oil separator.

18. The heat pump according to claim 11, wherein the accumulator is located between the compressor and the subcooler in the width of the outdoor unit in a planar view.

19. The heat pump according to claim 11, wherein:
the accumulator is provided downstream from the compressor in a flow path; and
the oil separator is provided upstream from the compressor in the flow path.

* * * * *